United States Patent
Tramoni

(12) 
(10) Patent No.: US 12,028,128 B2
(45) Date of Patent: Jul. 2, 2024

(54) NEAR-FIELD COMMUNICATION DEVICE

(71) Applicant: STMICROELECTRONICS (ROUSSET) SAS, Rousset (FR)

(72) Inventor: Alexandre Tramoni, Le Beausset (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 42 days.

(21) Appl. No.: 17/737,875

(22) Filed: May 5, 2022

(65) Prior Publication Data

US 2022/0368374 A1    Nov. 17, 2022

(30) Foreign Application Priority Data

May 11, 2021   (FR) ........................................ 2104975

(51) Int. Cl.
| | |
|---|---|
| H04B 5/00 | (2006.01) |
| H04B 5/24 | (2024.01) |
| H04B 5/48 | (2024.01) |
| H04B 5/72 | (2024.01) |
| H04B 5/73 | (2024.01) |
| H04Q 5/22 | (2006.01) |
| H04W 74/08 | (2009.01) |

(52) U.S. Cl.
CPC ................. *H04B 5/72* (2024.01); *H04B 5/24* (2024.01); *H04B 5/48* (2024.01); *H04B 5/73* (2024.01)

(58) Field of Classification Search
None
See application file for complete search history.

(56) References Cited

U.S. PATENT DOCUMENTS

| | | | |
|---|---|---|---|
| 8,643,470 B2 * | 2/2014 | Toriyama | G06K 19/0723 235/487 |
| 8,818,297 B2 * | 8/2014 | Merlin | H04B 5/0031 455/73 |
| 8,983,374 B2 * | 3/2015 | Wiley | H02J 50/40 455/41.1 |

(Continued)

FOREIGN PATENT DOCUMENTS

| | | |
|---|---|---|
| CN | 105591657 A | 5/2016 |
| CN | 108449742 A | 8/2018 |

(Continued)

OTHER PUBLICATIONS

The International Organization for Standardization and The International Electronic Commission, "Information technology—Telecommunications and information exchange between systems-Near Field Communication-Interface and Protocol (NFCIP-1)," *International Standard ISO/IEC*, Reference No. 18092:2013(E):1-52, Mar. 2013.

(Continued)

*Primary Examiner* — Tuan A Tran

(74) *Attorney, Agent, or Firm* — Seed IP Law Group LLP

(57) ABSTRACT

The present disclosure relates to a near-field communication device including a near-field communication controller. The near-field communication controller includes at least one first demodulator, adapted to apply a first type of demodulation to a first signal modulated according to a first or a second type of modulation; and at least one second demodulator, adapted to apply a second type of demodulation to the first signal.

18 Claims, 3 Drawing Sheets

(56) References Cited

U.S. PATENT DOCUMENTS

| | | | | |
|---|---|---|---|---|
| 9,019,167 | B2* | 4/2015 | Merlin | G06K 19/0726 |
| | | | | 343/822 |
| 9,031,502 | B2* | 5/2015 | Smith | H04B 5/0037 |
| | | | | 455/67.11 |
| 9,253,590 | B2* | 2/2016 | Bangs | H04B 5/00 |
| 9,621,228 | B2* | 4/2017 | Dobyns | H04W 12/08 |
| 9,685,996 | B1* | 6/2017 | Thoen | G06K 7/10336 |
| 9,800,294 | B2* | 10/2017 | Roh | H04B 5/0081 |
| 9,838,082 | B2* | 12/2017 | Dobyns | H04L 63/107 |
| 10,050,677 | B1* | 8/2018 | Thoen | H04L 25/0224 |
| 10,256,526 | B2* | 4/2019 | Lee | H01Q 1/243 |
| 10,356,537 | B2* | 7/2019 | Niklaus | H04B 5/0037 |
| 10,361,751 | B2* | 7/2019 | Moon | H04B 5/0031 |
| 10,541,728 | B2* | 1/2020 | Cho | H01Q 1/2225 |
| 11,296,750 | B2* | 4/2022 | Kerselaers | H04B 5/0093 |
| 2009/0309652 | A1 | 12/2009 | Kranabenter | |
| 2010/0190436 | A1* | 7/2010 | Cook | H04B 5/00 |
| | | | | 455/41.1 |
| 2012/0220227 | A1 | 8/2012 | Dobyns | |
| 2013/0072115 | A1 | 3/2013 | Dobyns | |
| 2013/0079037 | A1 | 3/2013 | Dobyns | |
| 2014/0256270 | A1 | 9/2014 | Cho et al. | |
| 2019/0174239 | A1 | 6/2019 | Niklaus et al. | |

FOREIGN PATENT DOCUMENTS

| | | |
|---|---|---|
| EP | 3493556 A1 | 6/2019 |
| KR | 20160091472 A | 8/2016 |

OTHER PUBLICATIONS

IEEE Communications Society, "IEEE Standard for Long Wavelength Wireless Network Protocol," IEEE Standards Document, IEEE Std 1902.1™—2009: 35 pages, Jan. 2009.

ISO and IEC, "Identification cards—Contactless integrated circuit cards—Proximity cards—Part 2: Radio frequency power and signal interface," ISO/IEC 14443-2:2016(E) Third edition: 52 pages, Jul. 2016.

* cited by examiner

NEAR-FIELD COMMUNICATION DEVICE

BACKGROUND

Technical Field

The present disclosure relates to electronic circuits and devices generally, and more particularly to near-field communication circuits and devices.

Description of the Related Art

Near-field communication (NFC) circuits are becoming more and more widespread and are used in many electronic devices, particularly smartphones.

BRIEF SUMMARY

There is a need for improved near-field communication devices.

One embodiment provides for a near-field communication device containing a near-field communication controller comprising:
at least one first demodulator adapted to apply a first type of demodulation to a first signal modulated according to a first or second type of modulation; and
at least one second demodulator adapted to apply a second type of demodulation to the first signal.

One embodiment further provides for a near-field communication system containing:
a first near-field communication device containing a near-field communication controller comprising:
at least one first demodulator adapted to apply a first type of demodulation to a first signal modulated according to a first or second type of modulation;
at least one second demodulator adapted to apply a second type of demodulation to the first signal; and
a second near-field communication device, external to the first near-field communication device and adapted to provide the first signal.

One embodiment provides a near-field communication method, wherein
a near-field communication device containing a near-field communication controller, comprising:
a first demodulator adapted to apply a first type of demodulation to a first signal modulated according to a first or second type of modulation;
a second demodulator adapted to apply a second type of demodulation to the first signal;
implements a second type of demodulation of the first signal with the second demodulator.

One embodiment provides a computer program comprising instructions that drive a near-field communication device containing a near-field communication controller, comprising:
at least one first demodulator adapted to apply a first type of demodulation to a first signal modulated according to a first or second type of modulation;
at least a second demodulator adapted to apply a second type of demodulation to the first signal;
to implement demodulation of the second type of the first signal with the second demodulator.

In one embodiment, the near-field communication controller includes a near-field detection device adapted to periodically analyze the presence of the first signal and adapted to form a second signal when the presence of the first signal is detected; and
the second signal comprises a first frequency related to a clock frequency of the first signal.

In one embodiment, the near-field detection device is formed by a finite state machine.

In one embodiment, the near-field communication controller includes a frequency analyzer adapted to determine a carrier frequency of the first signal.

In one embodiment, the frequency analyzer determines the carrier frequency of the first signal prior to the second type of demodulation; and
if the carrier frequency is approximately equal to, preferably equal to, 131 kilohertz (kHz), only the second type of demodulation is performed;
if the carrier frequency is approximately equal to, preferably equal to, 13.56 megahertz (MHz), both the first and second type of demodulation are performed.

In one embodiment, the near-field communication controller comprises the near-field detection device and the second signal comprises the first frequency;
the frequency analyzer determines a first number of cycles of the first frequency occurring during a period of a fifth signal serving as a reference and provided by an oscillator of the near-field communication controller; and
if the first number is within a first set of values, the carrier frequency of the first signal is considered to be 131 kHz;
if the first number is within a second set of values, the carrier frequency of the first signal is considered to be 13.56 MHz.

In one embodiment, the first set of values ranges from 2 to 4 and the second set of values ranges from 285 to 345.

In one embodiment, the near-field communication device includes a first oscillator circuit tuned to a frequency of approximately 13.56 MHz, preferably equal to 13.56 MHz, the first oscillator circuit comprising a first near-field communication antenna and a first impedance matching circuit.

In one embodiment, the near-field communication device includes a second oscillating circuit tuned to a frequency approximately equal to, preferably equal to, 131 kHz, the second oscillating circuit comprising a second near-field communication antenna and a second impedance matching circuit.

In one embodiment, the near-field communication controller comprises:
a first modulator adapted to provide a third signal modulated according to the first type of modulation; and
a second modulator adapted to provide a fourth signal modulated according to the second type of modulation.

In one embodiment:
the first demodulator is adapted to identify whether the first signal is modulated according to the first type of modulation;
the second demodulator is adapted to identify whether the first signal is modulated according to the second type of modulation; and
if the second demodulator identifies that the first signal is modulated according to the second type of modulation, a memory of the near-field communication controller is filled with data from the second type of demodulation.

In one embodiment, if the first demodulator identifies that the first signal is modulated according to the first type of modulation, a memory of the near-field communication controller is filled with data from the first demodulation type.

In one embodiment, the first type of modulation is implemented according to a standard selected from the ISO/IEC 14443-2:2016 and ISO18_092 standards;
the second type of modulation is implemented according to the IEEE1902_1-2009 standard;
the first type of demodulation is implemented according to a standard selected from the ISO/IEC 14443-2:2016 and ISO18_092 standards; and
the second type of demodulation is implemented according to the IEEE1902_1-2009 standard.

In one embodiment, the near-field communication controller is a controller adapted to implement at least one standard of the NFC forum.

BRIEF DESCRIPTION OF THE SEVERAL VIEWS OF THE DRAWINGS

The foregoing features and advantages, as well as others, will be described in detail in the following description of specific embodiments given by way of illustration and not limitation with reference to the accompanying drawings, in which.

DETAILED DESCRIPTION

Figure 1:
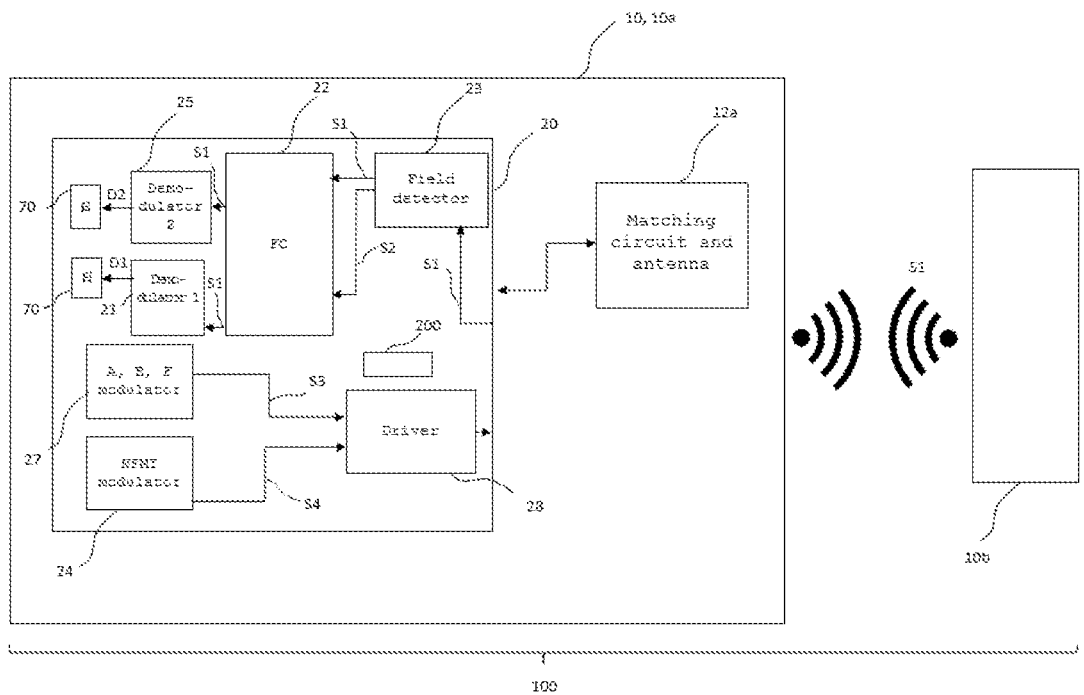
FIG. 1 shows a schematic view of one embodiment of a near-field communication system.

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, basic electronic elements such as transistors, resistors and related electronic circuits are not shown. The person skilled in the art will be able to use his or her knowledge to implement the various devices described and their operation.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front," "back," "top," "bottom," "left," "right," etc., or to relative positional qualifiers, such as the terms "above," "below," "higher," "lower," etc., or to qualifiers of orientation, such as "horizontal," "vertical," etc., reference is made to the orientation shown in the figures.

Unless specified otherwise, the expressions "around," "approximately," "substantially" and "in the order of" signify within 10%, and preferably within 5%.

Near-field communication (NFC) systems exploit a radio frequency electromagnetic field generated by one device (terminal or reader) to communicate with another device (card). In the case of smartphones in particular, the same device can operate in reader mode by generating a field for another device, or in card mode by capturing a field generated by another device. This technology relates to the establishment of very short distance communications (less than about ten centimeters) between two devices.

In the present description, a system is considered in which at least one of the devices is compatible with NFC technology according to the NFC Forum.

Increasingly, a single device must be capable of supporting communications having different standards. Typically, a phone compatible with NFC operations also incorporates the functionality of other short-range communication technologies. Among these other technologies, Bluetooth technology is used by many devices, in addition to NFC technology. However, the transceiver circuits used are unique to each technology.

In some applications, Bluetooth technology is replaced by a near-field magnetic induction (NFMI) communication technology. This NFMI technology has a greater range (up to about 2 meters) than NFC technology, which makes it compatible for replacing Bluetooth technology in certain applications. Compared to Bluetooth, NFMI technology has the advantage of a shorter range that favors the confidentiality of transmitted information and a better throughput.

An example of an application for which NFMI technology may be preferable to Bluetooth technology relates to wireless headsets or earphones for cell phones or the like. Such headsets most often use Bluetooth technology to communicate with the phone. The use of NFMI technology instead of Bluetooth in such an application would contribute in particular to improving the confidentiality of information transiting between the telephone and the earphones, in particular during telephone conversations.

However, NFC and NFMI technologies use overlapping frequencies and modulation techniques that are close to each other. This restricts the possibilities of equipping an electronic device such as a smartphone with both NFC-dedicated circuits and NFMI-dedicated circuits, to the extent that each circuit would interfere with the operation of the other.

The described embodiments plan to take advantage of certain analogies between the NFC and NFMI technologies, to allow the use of these two technologies by the same device while avoiding the use of one disturbing the operation of the other.

For this, it is planned to use all or part of the near-field communication circuits using the NFC technology of a device to also communicate using near-field magnetic induction technology (NFMI).

FIG. 1 shows a schematic view of one embodiment of a near-field communication system.

FIG. 1 shows a schematic view of a communication system comprising at least one near-field communication device 10a. The near-field communication device 10a includes a near-field communication controller 20.

In the following description, an electronic device that integrates at least one near-field communication circuit or controller implementing Near-Field Communication (NFC) protocols is referred to as a near-field communication device. "Near-field" is to be understood as an electromagnetic field of limited range ranging from a few centimeters to about 2 meters, depending on the protocols used.

The near-field communication (NFC) controller 20 includes various electronic elements or circuits for generating or detecting a radio frequency signal. In this example, it is assumed that the device 10, 10a, a smartphone for example, is capable of operating in NFC reader mode by transmitting a radio frequency field to another remote device 10b, or in card mode by sensing a field generated by that other remote device 10b.

According to the described embodiments, it is planned for the controller 20 also to be able to communicate using NFMI technology when the device 10a is within range of a remote device generating a near-field magnetic induction signal.

To do this, the fact that an NFC device, when not in reader mode, monitors (periodically) for the presence of an external electromagnetic field, is exploited. This allows for a configuration procedure to be implemented by the controller 20, between an NFC communication and an NFMI communication, depending on the nature of the detected field.

More particularly, it is planned for the controller 20, upon detecting the presence of a field within the range of which the device 10a is located, to first determine the type of technology used by the remote device.

In the example shown in FIG. 1, the controller 20 includes, inter alia:
 at least one first demodulator 21 (Demodulator 1) adapted to apply a first type of demodulation D1 to a first signal S1 modulated according to a first or second type of modulation M1, M2; and
 at least one second demodulator 25 (Demodulator 2) adapted to apply a second type of demodulation D2 to the first signal S1.

The near-field communication controller 20 first detects and analyzes the first near-field communication signal S1.

The first signal S1 originates from the second near-field communication device 10b that would be external to the near-field communication device 10, 10a, for example.

To simplify the following description, the same notation will be kept to designate signals that convey the same information even if they are physically different (e.g., analog or digital, modulated or demodulated, etc.). Thus, reference will be made to the signal S1 throughout the described processing chain, as long as this signal contains the information (data) sent by device 10b.

The first signal S1 is provided to the near-field communication controller 20 after being captured by an oscillating circuit 12a (First matching circuit and antenna) of the device 10a.

In the example shown in FIG. 1, the first oscillating circuit 12a is tuned to a frequency approximately equal to and preferably equal to 13.56 MHz.

The first oscillating circuit 12a includes a first near-field communication antenna and a first impedance matching circuit, in this example. In this configuration, if the first signal S1 has a carrier frequency of 13.56 MHz, then the first signal S1 can be received optimally.

According to this single antenna embodiment, this antenna and its impedance matching circuit are also adapted to pick up a first signal S1 that has a carrier frequency of the order of 131 kHz.

According to the described embodiments, the first signal S1 may be an NFC type signal or an NFMI type signal. The near-field communication controller 20 is such that it can operate a signal S1 using either type.

The NFC-type signal S1 is constructed according to a type of modulation that complies with ISO/IEC 14443-2:2016 Part 2: Radio frequency power and signal interface, or ISO18_092, such as type A, B, or F. These type of modulations of are common in near-field communication devices that implement NFC forum protocols.

When the first signal S1 is modulated according to an NFC protocol, the frequency of its carrier is approximately equal, preferably equal to, 13.56 MHz.

The NFMI-type signal S1 is constructed according to a type of modulation that complies with the IEEE1902_1-2009 standard. As an example, the NFMI modulation may be a phase-skipped type, such as the 8BPSK protocol, for example.

When the first signal is modulated according to an NFMI protocol, its carrier frequency is approximately equal to 131 kHz, for example, equal to 131.072 kHz.

In order to be able to operate a first signal S1, whether of an NFC or NFMI type, the near-field communication controller 20 comprises at least the first demodulator 21 adapted to apply demodulation of the first type D1 to the first signal S1. The first demodulator 21 may be adapted to identify whether the first signal S1 is modulated according to an NFC type A, B or F protocol on a carrier frequency at 13.56 MHz.

The near-field communication controller 20 further comprises at least the second demodulator 25 adapted to apply the second type of demodulation D2 to the first signal S1. The second demodulator 25 may be adapted to identify whether the first signal S1 is modulated according to an NFMI protocol.

Thus, if the first signal S1 is structured according to the NFC forum protocol, then the near-field communication controller 20 may be used as a standard NFC communication controller to receive information contained in the first signal S1 or to send information to it using that same NFC protocol. If the first signal is structured according to the NFMI protocol, then the near-field communication controller 20 can be used as a standard NFMI communication controller to receive information contained in the first signal S1 or to send information to it according to the same NFMI protocol. Such a configuration is advantageous because a single near-field communication controller 20 can communicate with devices using the NFC forum protocol or devices using an NFMI protocol and all without having to integrate several different communication controllers, each dedicated to an NFC or NFMI protocol. This greatly reduces the product development cost as well as the component cost.

Preferably, the near-field communication controller 20 includes a frequency analyzer 22 (FC), adapted to determine a carrier frequency of the first signal S1. This frequency analyzer 22 is adapted to determine whether the first signal S1 has a carrier frequency of 13.56 MHz or 131 kHz, or another frequency. Depending on the detected carrier frequency, the second demodulator 25 and possibly the first demodulator 21 can be activated. This contributes to reducing the controller's power consumption by allowing only one and/or the other of the demodulators to be activated, depending on the detected carrier frequency.

Preferably, the near-field communication controller 20 further includes a near-field detection device 23 (Field detector) that monitors periodically for the presence of a first signal S1. The near-field detection device 23 may be arranged at the input of the frequency analyzer 22, as shown. If the first signal S1 is detected by the near-field detection device 23. Then the frequency analyzer 22 is energized. If a frequency equal to 13.56 MHz or 131 kHz is detected, then the near-field communication controller 20 can switch from a low power standby phase to an active phase where the near-field communication controller 20 switches to a so-called NFC protocol card or reader mode, for example, or a so-called peer-to-peer [P2P] mode.

According to the embodiment illustrated in FIG. 1, the near-field detection device 23 is further preferably designed to form a second signal S2 when the presence of the first signal S1 is detected. The second signal S2 corresponds to a reconstruction of a clock frequency from the first signal S1. In other words, signal S2 constitutes a clock signal for the frequency analyzer, extracted from signal S1. This clock signal may correspond to a fraction or a multiple of the modulation rate of the first signal S1. The fraction may be equal to ½, for example.

In a variant, the near-field detection device 23 is equivalent to a near-field detection device of a standard NFC controller, in terms of its physical implementation.

As an example, the near-field detection device 23 may be formed by a finite state machine. This allows for fast signal processing and keeps power consumption low.

As conventional for an NFC controller, the latter comprises a processor (symbolized by a block 200) as well as one or more volatile or non-volatile memories 70 (m). For simplicity, the links between the various elements not required for understanding the described embodiments are not detailed. Upon receipt, the communication controller 20 fills a memory 70 with demodulated data D1 from the NFC demodulator 21.

According to the described embodiment, the memory 70 or another memory 70 of the controller 20 may be filled with NFMI-type data derived from the second type of demodulation D2 applied to the first signal S1 when the first signal S1 is formed using the NFMI protocol.

In order to enable data to be sent from the first near-field communication device 10, 10a to a second near-field communication device 10b, for example, the near-field communication controller 20 may comprise a first modulator 27 (A, B, F modulator) and a second modulator 24 (NFMI modulator).

The first modulator 27 is adapted to provide a third modulated signal S3 of the NFC type (A, B or F). The third signal S3 is transmitted to the oscillator circuit 12a via one or more amplifiers 28 (Driver) of a radio frequency transmission chain which, for simplicity, is only partially shown. Thus, the first near-field communication device 10a can operate as a standard NFC communication device.

The second modulator 24 is adapted to provide a fourth NFMI-type modulated signal S4. The fourth signal S4 may be transmitted to the oscillator circuit 12a via the same transmit chain as used for the NFC type, with possible adjustment of matching circuits. The fourth signal S4 can be modulated by phase jump as with the 8 binary phase shift keying (BPSK) protocol. The fourth S4 signal can also be encoded using a differential Manchester type. Thus, using the fourth signal S4, the first near-field communication device 10, 10a may additionally function as an NFMI communication device.

In order to limit interference between a signal modulated using an NFC protocol and another signal modulated using an NFMI protocol, it is possible to envisage that the transmission of these two signals may not be simultaneous.

Figure 2:
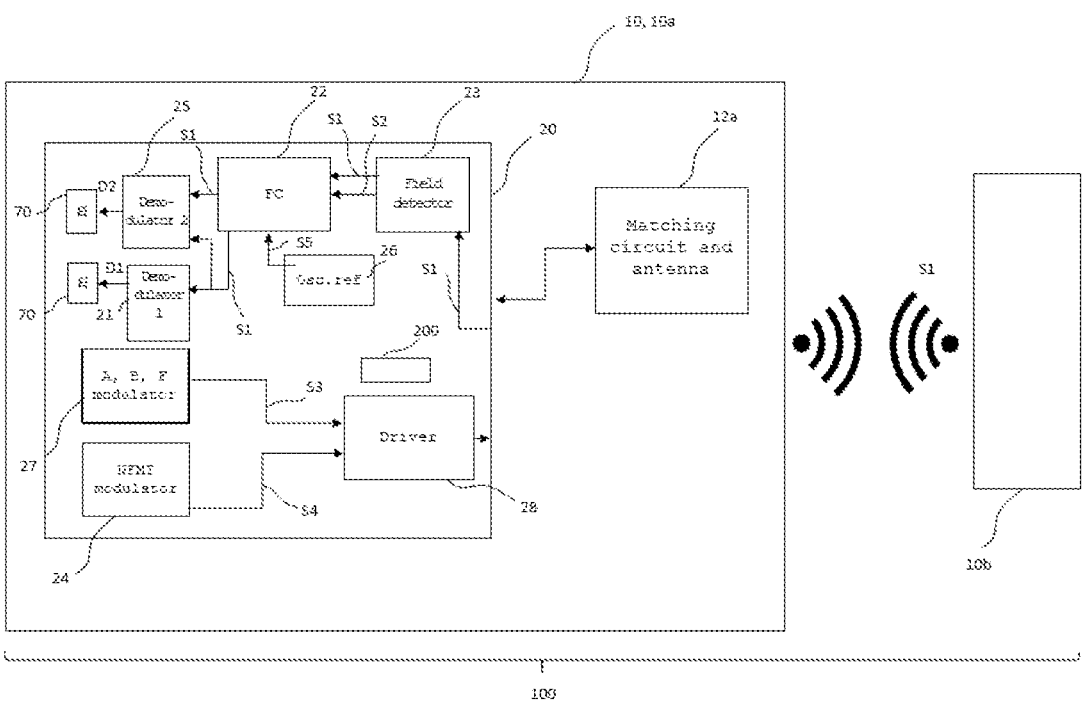
FIG. 2 shows a schematic view of another embodiment of a near-field communication system.

FIG. 2 shows a schematic view of another embodiment of a near-field communication system.

The elements of the embodiment of FIG. 2 taken from the embodiment described in connection with FIG. 1 will not be detailed again.

In comparison to the embodiment of FIG. 1, the near-field communication controller 20 of FIG. 2 includes an oscillator 26 (Ref. Osc.). The oscillator 26 generates a fifth signal S5 serving as a reference for determining the carrier frequency of the first signal S1.

An example of operation of the controller 20 with the oscillator 26 will be described later in connection with FIG. 5.

Figure 3:
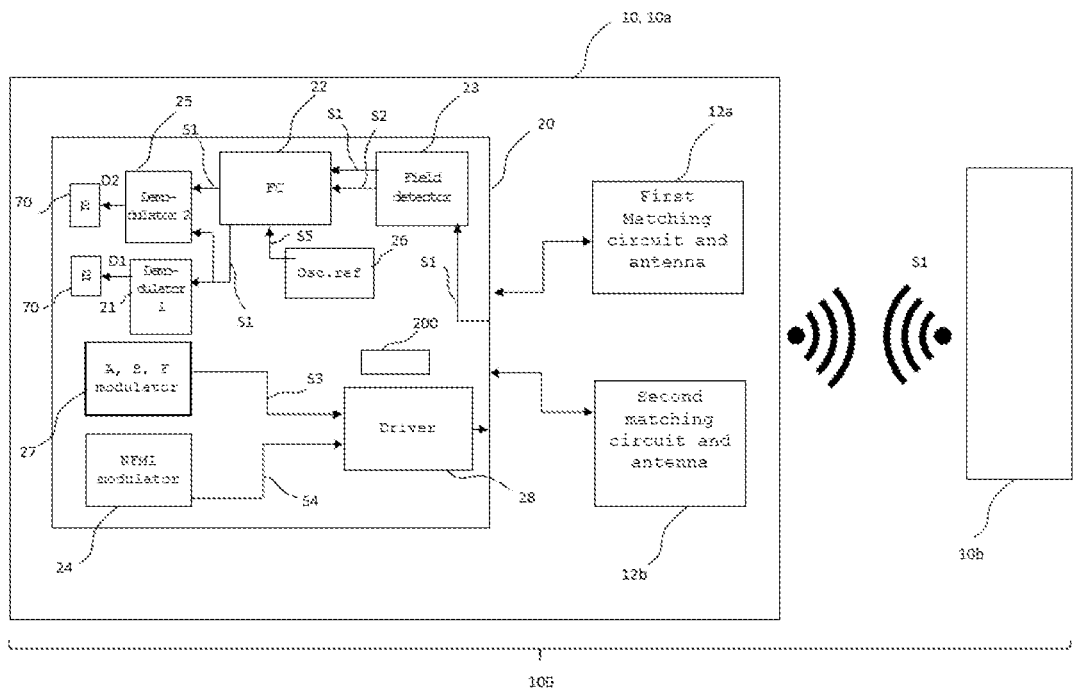
FIG. 3 shows a schematic view of yet another embodiment of a near-field communication system.

FIG. 3 shows a schematic view of yet another embodiment of a near-field communication system.

The elements of the embodiment of FIG. 3 taken from the embodiment described in connection with FIG. 1 or the embodiment described in connection with FIG. 2 will not be detailed again.

In comparison to the embodiments of FIGS. 1 and 2, the near-field communication device 10, 10a of FIG. 3 includes a second matching circuit and antenna 12b. This second oscillating circuit 12b is then tuned to a frequency approximately equal to and preferably equal to 131 kHz.

The second oscillating circuit 12b may include a second near-field communication antenna and a second impedance matching circuit, different from the first antenna and the first impedance matching circuit. The second oscillating circuit shares the controller 20 with the first oscillating circuit 12a. The presence of separate oscillating circuits for the 13.56 MHz and 131 kHz frequencies allows the corresponding circuits to be optimized for improved communications.

According to another embodiment not shown, the same antenna shares two impedance matching circuits dedicated to the 13.56 MHz and 131 kHz frequencies, respectively.

The fact that a near-field communication device or system 10, 10a, 10b is implemented as described in the above embodiments allows for sharing the circuits of an NFC controller for an NFMI operation. This contributes to reducing the footprint of the device.

The first near-field communication device 10, 10a and the second near-field communication device 10b form a near-field communication system 100, for example, in which the second near-field communication device 10b is in the form of one or more earphones that a user wears in their ears.

Figure 4:
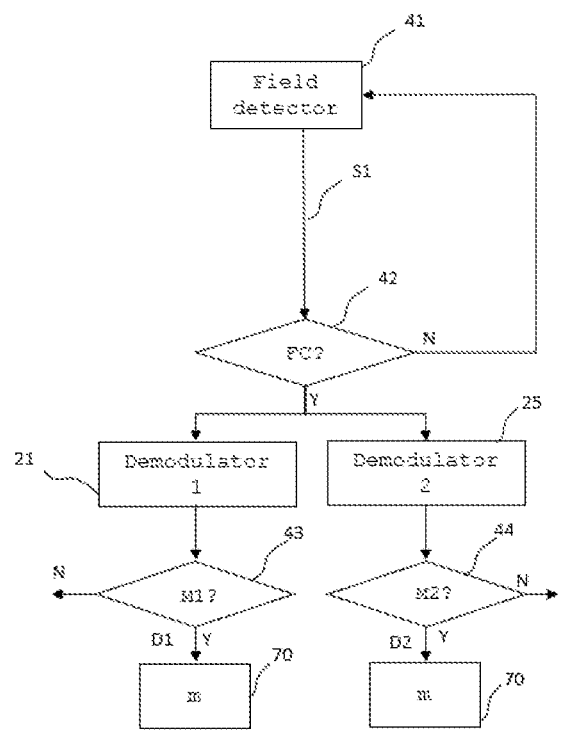
FIG. 4 illustrates one embodiment of a near-field communication method, in a schematic view.

FIG. 4 illustrates one embodiment of a near-field communication method, in a schematic view.

FIG. 4 illustrates a communication method implemented by the communication device 10, 10a according to the embodiment of FIG. 1.

Upon receipt of a signal by the oscillator circuit 12a, the field detector 23 detects (block 41, Field detector) the presence of the signal S1 and "wakes up" the controller circuits 20. The frequency analyzer 22 then determines the carrier frequency of the first signal S1, to verify that it corresponds to a frequency of 13.56 MHz (block 42, FC?). As long as the detected frequency does not match 13.56 MHz (output N of block 42), the method loops back to field detection.

If the determined carrier frequency is approximately equal, preferably equal to 13.56 MHz (output Y of block 42), the second type D2 demodulation is applied to the first signal S1 with the second demodulator 25 and, in parallel, the first type D1 demodulation is applied to the first signal S1 with the first demodulator 21.

Listed demodulator 21 (Demodulator 1), it is verified whether the signal S1 respects a first type of modulation M1 (block 43, M1?) corresponding to one of the NFC types, A, B or F. If not (output N of block 43), the demodulator 21 is stopped. If the signal S1 corresponds to an NFC signal (output Y of block 43), the result D1 of the demodulation is sent to one of the memories 70 (m) for interpretation by other usual circuits of the device.

Listed demodulator 25 (Demodulator 2), it is verified whether the signal S1 respects a second type of modulation M1 (block 44, M2?) corresponding to the NFMI supported protocol, such as 8BPSK. If not (output N of block 44), the demodulator 25 is stopped. If the signal S1 does correspond to an NFC signal (output Y of block 44), the result D2 of the demodulation is sent to one of the memories 70 for interpretation by other usual circuits of the device.

In a variant, the frequency analyzer 22 determines whether the first signal S1 has a carrier frequency of 13.56 MHz or 131 kHz, assuming that the latter can be picked up by the oscillator circuit 12a tuned to 13.56 MHz. The method may further determine whether the carrier frequency is approximately equal to, preferably equal to 131 kHz, and perform only the second type of demodulation D2.

Figure 5:
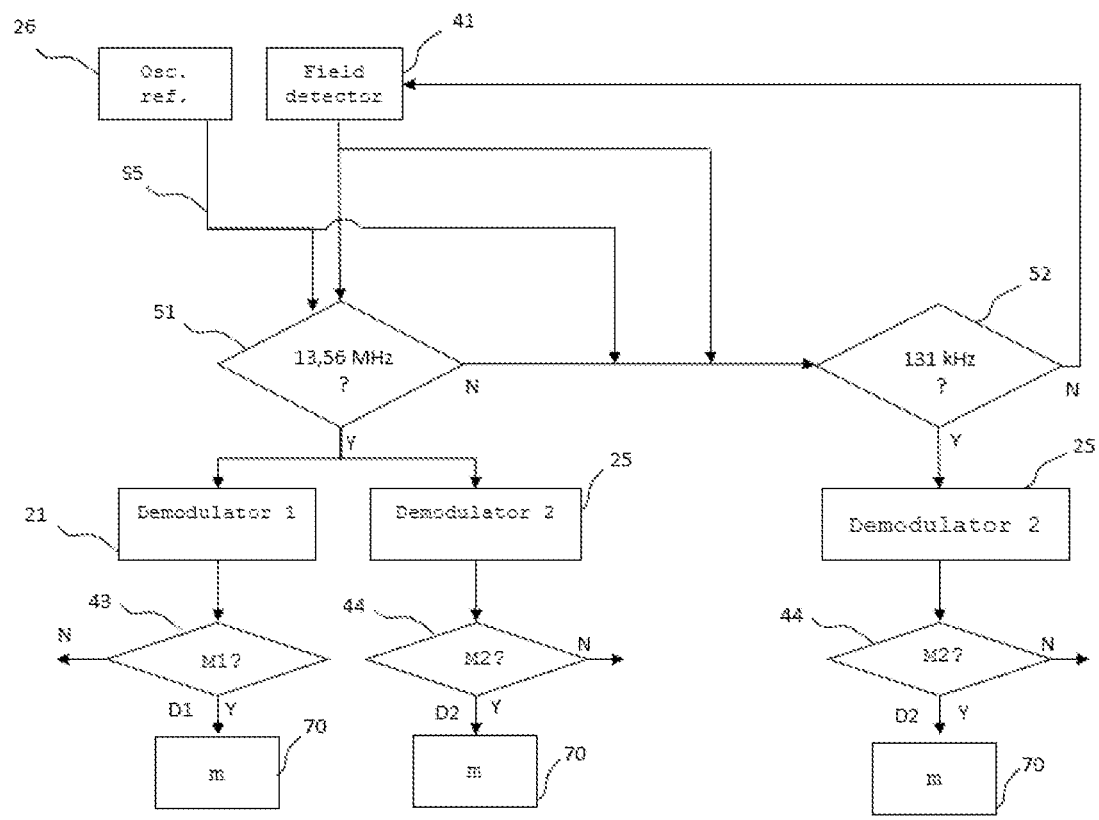
FIG. 5 illustrates another embodiment of a near-field communication method, in a schematic view.

FIG. 5 illustrates another embodiment of a near-field communication method, in a schematic view.

FIG. 5 illustrates a communication method of a communication device 10, 10a containing two oscillating circuits 12a and 12b, or according to the embodiment of FIG. 3.

According to this embodiment, the field detector 23 is shared by the two oscillating circuits 12a, 12b. It detects a field (block 41, field detector) and wakes up the other controller circuits (at least the frequency analyzer) when a signal S1 is detected.

In the example of FIG. 5, the frequency analyzer 22 determines (block 51, 13.56 MHz?), using the reference oscillator 26 (S5, FIG. 3) and a cycle count, whether the frequency is 13.56 MHz. If the cycle count identifies that the carrier frequency of the signal is 13.56 MHz (Y output of block 51), the method implements the same steps as described in connection with FIG. 4 at the Y output of block 42.

In the event that the cycle count does not identify a frequency of 13.56 MHz (output N of block 51), a check is made (block 52, 131 kHz?) to see if the cycle count corresponds to a frequency of 131 kHz by using the reference oscillator 26 (S5, FIG. 3).

If the carrier frequency of the signal S1 is indeed 131 kHz (output Y of block 52), the method applies only the second type of demodulation D2 to the first signal S1. This amounts to performing only the branch of the method in FIG. 4 using demodulator 25 (blocks 25, 44, 70). In the case where the cycle count does not identify a frequency equal to or approximately equal to 131 kHz, the method loops back to field detection (output N of block 52).

In an exemplary embodiment, the cycle count consists of a count of a first number C1 of cycles occurring during a period of the fifth signal S5. If the first number C1 is within a first set of values V1, then the carrier frequency of the incident signal S1 will be considered to be 131 kHz (output Y of block 52). If the first number C1 is within a second set of values V2, then the carrier frequency of the first signal S1 will be considered to be 13.56 MHz (output Y of block 51).

In one example, the first set of values V1 ranges from 2 to 4. The second set of values V2 may further range from 285 to 345. This allows for robust discrimination of the carrier frequency value of signal S1.

In the examples illustrated in FIGS. 4 and 5, if the second demodulator 25 identifies that the first signal S1 is modulated according to the second type of modulation M2, a memory 70 of the near-field communication controller 20 is filled with data from the second type of demodulation D2. In this case, it is possible for the near-field communication controller 20 to stop the first type of demodulation D1 in order to not complicate the data processing. This also ensures that the data relating to the NFC and NFMI signal types are not mixed and limits interference.

Additionally or alternatively, if the first demodulator 21 identifies that the first signal S1 is modulated according to the first type of modulation M1, a memory 70 of the near-field communication controller 20 is filled with data from the first type of demodulation D1. In this case, it is possible to stop the second type of demodulation D2 in order to not complicate the data processing. This also ensures that the data relating to the NFC and NFMI signal types are not mixed and limits interference.

The described embodiments may be implemented in whole or in part using software from a computer program executed by the processor 200. The program comprises instructions that cause the processor and, more generally, a near-field communication device 10 as described above, to implement the described method.

The computer program executed by the processor 200 may be stored in a memory arranged in the near-field communication controller 20, for example, or in the near-field communication device 10, 10a, 10b.

Various embodiments and variants have been described. Those skilled in the art will understand that certain features of these embodiments can be combined and other variants will readily occur to those skilled in the art.

Finally, the practical implementation of the embodiments and variants described herein is within the capabilities of those skilled in the art based on the functional description provided hereinabove, in particular, with respect to the first and second demodulations D1, D2, the first and second modulations M1, M2, the frequency analysis by the analyzer 22 and the near-field detection by the near-field detection device 23. The near-field communication controller 20 or the near-field communication device 10, 10a may comprise a control and/or computing device to read and implement the instructions of the computer program executed by the processor 200. Such a control and/or calculator device is well known to those skilled in the art and is not described in detail.

A near-field communication device (10) containing a near-field communication controller (20) may be summarized as including at least one first demodulator (21) adapted to apply a first type of demodulation (D1) to a first signal (S1) modulated according to a first or second type of modulation (M1, M2); at least one second demodulator (25) adapted to apply a second type of modulation (D2) to the first signal (S1).

A near-field communication system (100) containing a first near-field communication device (10a) containing a near-field communication controller (20) may be summarized as including at least one first demodulator (21) adapted to apply a first type of demodulation (D1) to a first signal (S1) modulated according to a first or second type of modulation (M1, M2); at least one second demodulator (25) adapted to apply a second type of modulation (D2) to the first signal (S1); and a second near-field communication device (10b), external to the first near-field communication device (10a) and adapted to provide the first signal (S1).

A near-field communication method, wherein a near-field communication device (10a) containing a near-field communication controller (20) may be summarized as including a first demodulator (21) adapted to apply a first type of modulation (D1) to a first signal (S1) modulated according to a first or second type of modulation (M1, M2); a second demodulator (25) adapted to apply a second type of modulation (D2) to the first signal (S1); implements a second type of modulation (D2) of the first signal (S1), with the second demodulator (25).

A computer program comprising instructions that drive a near-field communication device (10) containing a near-field communication controller (20) may be summarized as including at least one first demodulator (21) adapted to apply a first type of modulation (D1) to a first signal (S1) modulated according to a first or second type of modulation (M1, M2); at least one second demodulator (25) adapted to apply a second type of modulation (D2) to the first signal (S1); to implement the second type of modulation (D2) of the first signal (S1) with the second demodulator (25).

The near-field communication controller (20) may include a near-field detection device (23) adapted to periodically analyze the presence of the first signal (S1) and adapted to form a second signal (S2) when the presence of the first signal (S1) is detected; and the second signal (S2) may include a first frequency related to a clock frequency of the first signal (S1).

The near-field detection device (23) may be formed by a finite state machine.

The near-field communication controller (20) may include a frequency analyzer (22) adapted to determine a carrier frequency of the first signal (S1).

The frequency analyzer (22) may determine the carrier frequency of the first signal (S1) prior to the second type of demodulation (D2); and if the carrier frequency is approximately equal, preferably equal, to 131 kHz, the second type of demodulation (D2) alone may be performed; if the carrier frequency is approximately equal to, preferably equal to, 13.56 MHz, both the first type of demodulation (D1) and the second type of demodulation (D2) may be performed.

The near-field communication controller (20) may include the near-field detection device (23) and the second signal (S2) may include the first frequency (F1); the frequency analyzer (22) may determine a first number (C1) of cycles of the first frequency (F1) occurring during a period of a fifth signal (S5) serving as a reference and provided by an oscillator (26) of the near-field communication controller (20); and if the first number (C1) is within a first set of values (V1), the carrier frequency of the first signal may be considered to be 131 kHz; if the first number (C1) is within a second set of values (V2), the carrier frequency of the first signal (S1) may be considered to be 13.56 MHz.

The first set of values (V1) may range from 2 to 4 and wherein the second set of values (V2) may range from 285 to 345.

The near-field communication device (10) may include a first oscillating circuit (12a) tuned to a frequency of approximately 13.56 MHz, preferably 13.56 MHz, the first oscillating circuit (12a) may include a first near-field communication antenna and a first impedance matching circuit.

The near-field communication device (10) may include a second oscillating circuit (12b) tuned to a frequency approximately equal to, preferably equal to, 131 kHz, the second oscillating circuit (12b) may include a second near-field communication antenna and a second impedance matching circuit.

The near-field communication controller (20) may include a first modulator (27) adapted to provide a third signal (S3) modulated according to the first type of modulation (M1); and a second modulator (24) adapted to provide a fourth signal (S4) modulated according to the second type of modulation (M2).

The first demodulator (21) may be adapted to identify whether the first signal (S1) is modulated according to the first type of modulation (M1); the second demodulator (25) may be adapted to identify whether the first signal (S1) is modulated according to the second type of modulation (M2); and if the second demodulator (25) identifies that the first signal (S1) is modulated according to the second type of modulation (M2), a memory (70) of the near-field communication controller (20) may be filled with data from the second type of demodulation (D2).

If the first demodulator (21) identifies that the first signal (S1) is modulated according to the first type of modulation (M1), a memory (70) of the near-field communication controller (20) may be filled with data from the first type of demodulation (D1).

The first type of modulation (M1) may be implemented according to a standard selected from the ISO/IEC 14443-2:2016 and ISO18_092 standards; the second type of modulation (M2) may be implemented according to the IEEE1902_1-2009 standard; the first type of demodulation (D1) may be implemented according to a standard selected from the ISO/IEC 14443-2:2016 and ISO18_092 standards; and the second type of demodulation (D2) may be implemented according to the IEEE1902_1-2009 standard.

The near-field communication controller (20) may be a controller adapted to implement at least one NFC forum standard.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A near-field communication device, comprising:
   a near-field communication controller including:
      at least one first demodulator configured to perform a first type of demodulation on a first signal, the first signal being modulated according to a first type of modulation or a second type of modulation; and
      at least one second demodulator configured to perform a second type of demodulation on the first signal; and
      a near-field detection device configured to:
         periodically detect whether the first signal is present; and
         generate a second signal in response to detecting that the first signal is present, wherein the second signal includes a first frequency associated with a clock frequency of the first signal.

2. The near-field communication device according to claim 1, wherein the near-field detection device is implemented by a finite state machine.

3. The near-field communication device according to claim 1, wherein the near-field communication controller includes a frequency analyzer configured to determine a carrier frequency of the first signal.

4. The near-field communication device according to claim 3, wherein:
   the frequency analyzer is configured to determine the carrier frequency of the first signal prior to the at least one second demodulator performing the second type of demodulation; and
   in response to the carrier frequency being 131 kilohertz (kHz), the second type of demodulation alone is performed, and in response to the carrier frequency being 13.56 megahertz (MHz), both the first type of demodulation and the second type of demodulation are performed.

5. The near-field communication device according to claim 3, wherein:

the near-field communication controller includes a near-field detection device and the second signal includes a first frequency;
the frequency analyzer is configured to determine a first number of cycles of the first frequency occurring during a period of a third signal, wherein the third signal is a reference signal and the third signal is provided by an oscillator of the near-field communication controller; and
in response to the first number being is within a first set of values, the carrier frequency of the first signal is determined to be 131 kHz, and in response to the first number being within a second set of values, the carrier frequency of the first signal is determined to be 13.56 MHz.

6. The near-field communication device according to claim 5, wherein the first set of values ranges from 2 to 4 and the second set of values ranges from 285 to 345.

7. The near-field communication device according to claim 1, comprising:
a first oscillating circuit tuned to a frequency of 13.56 MHz and including a first near-field communication antenna and a first impedance matching circuit.

8. The near-field communication device according to claim 7, comprising:
a second oscillating circuit tuned to a frequency of 131 kHz and including a second near-field communication antenna and a second impedance matching circuit.

9. The near-field communication device according to claim 1, comprising:
a first modulator configured to provide a third signal modulated according to the first type of modulation; and
a second modulator configured to provide a fourth signal modulated according to the second type of modulation.

10. The near-field communication device according to claim 1, wherein:
the first demodulator is configured to identify whether the first signal is modulated according to the first type of modulation;
the second demodulator is configured to identify whether the first signal is modulated according to the second type of modulation; and
in response to the second demodulator identifying that the first signal is modulated according to the second type of modulation, data associated with the second type of demodulation is stored in a memory of the near-field communication controller.

11. The near-field communication device according to claim 10, wherein, in response to the first demodulator identifying that the first signal is modulated according to the first type of modulation, data associated with the first type of demodulation is stored in a memory of the near-field communication controller.

12. The near-field communication device according to claim 1, wherein:
the first type of modulation is implemented according to a standard selected from the ISO/IEC 14443-2:2016 and ISO18_092 standards;
the second type of modulation is implemented according to the IEEE1902_1-2009 standard;
the first type of demodulation is implemented according to a standard selected from the ISO/IEC 14443-2:2016 and ISO18_092 standards; and
the second type of demodulation is implemented according to the IEEE1902_1-2009 standard.

13. The near-field communication device according to claim 1, wherein the near-field communication controller is configured to implement at least one near-field communication (NFC) forum standard.

14. A near-field communication system, comprising:
a first near-field communication device including:
a near-field communication controller including:
at least one first demodulator configured to perform a first type of demodulation on a first signal, the first signal being modulated according to a first type of modulation or a second type of modulation; and
at least one second demodulator configured to perform a second type of demodulation on the first signal; and
a second near-field communication device, external to the first near-field communication device, configured to output the first signal, wherein the near-field communication controller includes a frequency analyzer configured to determine a carrier frequency of the first signal, wherein the frequency analyzer is configured to determine the carrier frequency of the first signal prior to the at least one second demodulator performing the second type of demodulation.

15. A method, comprising:
performing, by a first demodulator of a near-field communication controller of a near-field communication device, a first type of demodulation on a first signal, the first signal being modulated according to a first type of modulation or a second type of modulation;
performing, by a second demodulator of the near-field communication controller, a second type of demodulation on the first signal;
periodically detecting, by a near-field detection device of the near-field communication controller, whether the first signal is present;
generating, by the near-field detection device, a second signal in response to detecting that the first signal is present; and
generating the second signal to include a first frequency associated with a clock frequency of the first signal.

16. The method according to claim 15, comprising:
determining, by a frequency analyzer of the near-field communication controller, a first number of cycles of the first frequency occurring during a period of a third signal, wherein the third signal is a reference signal and the third signal is provided by an oscillator of the near-field communication controller.

17. A memory having stored thereon executable instructions that, when executed by a controller, cause the controller to:
perform a first type of demodulation on a first signal, the first signal being modulated according to a first type of modulation or a second type of modulation;
perform a second type of demodulation on the first signal;
periodically detect whether the first signal is present;
generate a second signal in response to detecting that the first signal is present; and
generate the second signal to include a first frequency associated with a clock frequency of the first signal.

18. The memory as according to claim 17, wherein the executable instructions cause the controller to:
determine a first number of cycles of the first frequency occurring during a period of a third signal, wherein the third signal is a reference signal and the third signal is provided by an oscillator of the controller.

\* \* \* \* \*